United States Patent [19]

Milligan

[11] Patent Number: 5,653,175
[45] Date of Patent: Aug. 5, 1997

[54] VACUUM HIGHWAY VEHICLE

[76] Inventor: George Truett Milligan, 929 E. Bailey Rd., Naperville, Ill. 60565

[21] Appl. No.: 529,950

[22] Filed: Sep. 15, 1995

[51] Int. Cl.[6] .................................................. B01B 13/10
[52] U.S. Cl. .................. 104/138.1; 104/281; 104/290
[58] Field of Search .................. 104/138.1, 281, 104/284, 286, 290, 292, 293; 318/585; 105/365

[56] References Cited

U.S. PATENT DOCUMENTS

| 3,155,050 | 11/1964 | Hafner | 104/138.1 |
|---|---|---|---|
| 3,566,800 | 3/1971 | Chuan | 104/138.1 |
| 3,871,301 | 3/1975 | Kolm et al. | 104/284 X |
| 4,148,260 | 4/1979 | Minovitch | 104/138.1 |
| 5,282,424 | 2/1994 | O'Neill | 104/138.1 X |
| 5,360,470 | 11/1994 | Ono et al. | 104/284 |
| 5,435,253 | 7/1995 | Milligan | 104/138.1 |

FOREIGN PATENT DOCUMENTS

| 74458 | 3/1990 | Japan | 104/138.1 |
|---|---|---|---|
| 112302 | 5/1991 | Japan | 104/138.1 |
| 2208634 | 4/1989 | United Kingdom | 104/138.1 |

*Primary Examiner*—S. Joseph Morano

[57] ABSTRACT

A vacuum highway and vehicle system is composed of a cylindrical vehicle structure which travels in an evacuated medium. An electromagnetic propulsion system on the structure is provided for acceleration and deceleration the vehicle along the highway by interacting with magnets on the highway. An electromagnetic rotational stabilization system on the structure also cooperates with the highway magnets to prevent uncontrolled rotation of the structure during travel. The vehicle structure is levitated for travel through the highway by an electrostatic levitation system, which is composed of electrostaticly charged surfaces on the structure and the highway which interact. The surfaces on the highway are segmented to prevent migration of the charge.

2 Claims, 5 Drawing Sheets

VACUUM HIGHWAY VEHICLE

TECHNICAL FIELD

The present invention relates to travel in the "vacuum highway" of Milligan U.S. Pat. No. 5,435,253 and the invention provides a vehicle to make the transition from atmosphere into a vacuum highway. The present invention allows high speed travel similar to space travel without the cost and complexity associated with space craft launches. Technology and materials are readily available for development of this invention and associated industry.

BACKGROUND OF THE INVENTION

Space technology has been applied to solve many of man's problems; however one of the most basic space technologies (the high velocity of space craft in the vacuum of space) has not been applied generally. The orbital velocities in the vacuum of space, which space craft maintain without substantial energy, can be applied to earth transportation. While space craft travel nearly 20,000 miles per hour, transportation systems on earth are typically designed for travel from nearly 50 to 500 miles per hour. To travel at speeds close to those of space craft near the Earth's surface, near space conditions have to be created for the vehicles. The near absolute vacuum of space is created in vacuum highways.

For a vehicle to reach high speeds, it must levitate inside the vacuum highway so friction does not become a significant force. Options for forces to provide levitation include rocket propulsion, electromagnetic force, and electrostatic force. Electrostatic force is presented in this application because the high voltages necessary for significant electrostatic forces can be maintained in a near absolute vacuum. The rocket propulsion or electromagnetic forces could be applied similarly. Creation of a transportation system with near orbital speeds has the potential to improve commerce and communication among peoples of the earth. The vacuum highway vehicle is an element of that transportation system.

BRIEF DISCLOSURE OF THE INVENTION

The preferred embodiment of the present invention is a cylinder with hemispherical ends. The cylinder will fit into the vacuum highway with sufficient clearance for high speed travel without contact with the sides of the vacuum highway. The cylinder will have at least four large surface electrical conductors which will hold the charge necessary for electrostatic levitation. These will be placed on each quadrant of the lower or upper half of the horizontal cylinder. These will provide lift and pitch control. Sensors will monitor the vertical position of each quadrant and adjust the charge as required to maintain the desired position. There will also be vertical electrical propulsion conductors along the sides of the cylinder. The current in these vertical propulsion conductors provides the propulsion force as the conductors cut through magnetic fields from magnets attached to the side of the vacuum highway. Commutation is required for the vertical propulsion conductors to maintain the propulsion force.

Both the electrostatic charges on the vehicle surface and the current for the electromotive force are provided by batteries inside the vehicle or from rectified ac power transmitted through electromagnetically coupled coils (or electrostatically coupled plates) mounted in the vehicle and vacuum highway. The electrostatic charges on the vacuum highway are provide by an external source. To prevent migration of charge on the vacuum highway away from the vehicle, the conductor on the vacuum highway will be segmented. The segments will be much shorter than the vehicle. Diodes will allow each segment to charge but prevents a discharge or migration of charge away from the segment to other portions of the conductor.

The passenger compartment of the vehicle is in a second cylinder inside the first. The second cylinder provides a second containment to prevent a leak in the first cylinder from depressurizing the passenger compartment. The passenger compartment will contain seats for the passengers. Redundant air supplies and temperature controls provide a comfortable, safe environment. The compartment is very basic to minimize the weight of the vehicle.

The outer cylinder of the vehicle is composed of metal and plastic. The inner cylinder is also composed of metal and/or plastic.

For the vehicle to pass through the vacuum highway seal, ballast tanks are filled with water by pumps. The vehicle sinks into the water of the seal and travels to the dock. Pumps also provide the propulsion while in the water. The vehicle floats while tied to the dock. Once beside the dock and floating the vehicle is unloaded, then reloaded. Water ballast is taken on to submerge the vehicle. While taking on the ballast the vehicle is propelled to the exit vacuum highway seal. The exit seal can be the same as the entrance seal or a seal to another vacuum highway. When the vehicle reaches the bottom of the seal, the ballast is pumped from the tanks giving the vehicle lift through the water seal and acceleration into the vacuum highway. Once in the vacuum highway the vehicle accelerates to near orbital speeds and travels rapidly to the next destination.

Vacuum lock stations will be installed along the vacuum highway as required for transfer of passengers and cargo without passage through a vacuum highway seal. At the vacuum lock stations the vehicle will stop in a bay. O-rings in the bay will form a seal around the vehicle. The volume between the O-rings will be pressurized to allow the hatches in the vacuum highway and the vehicle to be opened.

In the vacuum lock stations an equalizing line will connect the volumes at both ends of the vehicle to assure there is not a differential pressure, which could push the vehicle out the bay during a stop.

DETAILED DESCRIPTION

Figure 1:
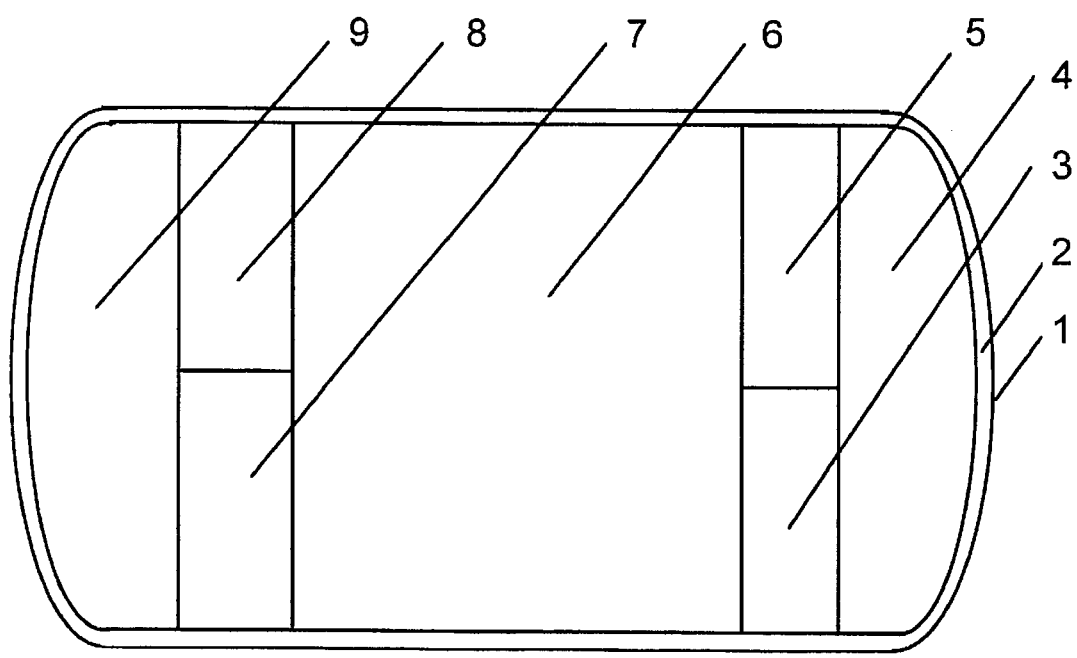
FIG. 1 is a section of the vacuum highway vehicle showing the primary components. The outer cylinder 1 provides containment for a habitable environment when the vehicle is in a near absolute vacuum, submerged in water, or floating. The inner cylinder 2 provides a secondary containment should the outer cylinder rupture. Compartments are located inside the secondary containment. The ballast tanks 4 & 9 contain water when the vehicle is submerged. When the vehicle is floating or in the vacuum highway the ballast tanks are empty. The pump compartment 3 contains the pumps for filling the ballast tanks. These pumps also empty the tanks and provide propulsion when the vehicle is under water or floating in the water. The battery compartment 5 contains the batteries for the electrical power. Electrical power is used for levitation, propulsion, operation of the pumps, lighting and temperature control. The passenger compartment 6 contains chairs for the passengers and storage space for bags and packages. The passenger compartment also contains the control panel. The gas storage compartment 7 contains oxygen bottles for breathing air. The fan compartment 8 contains fans for circulating the air and filters for removal of noxious gases.
Figure 2:
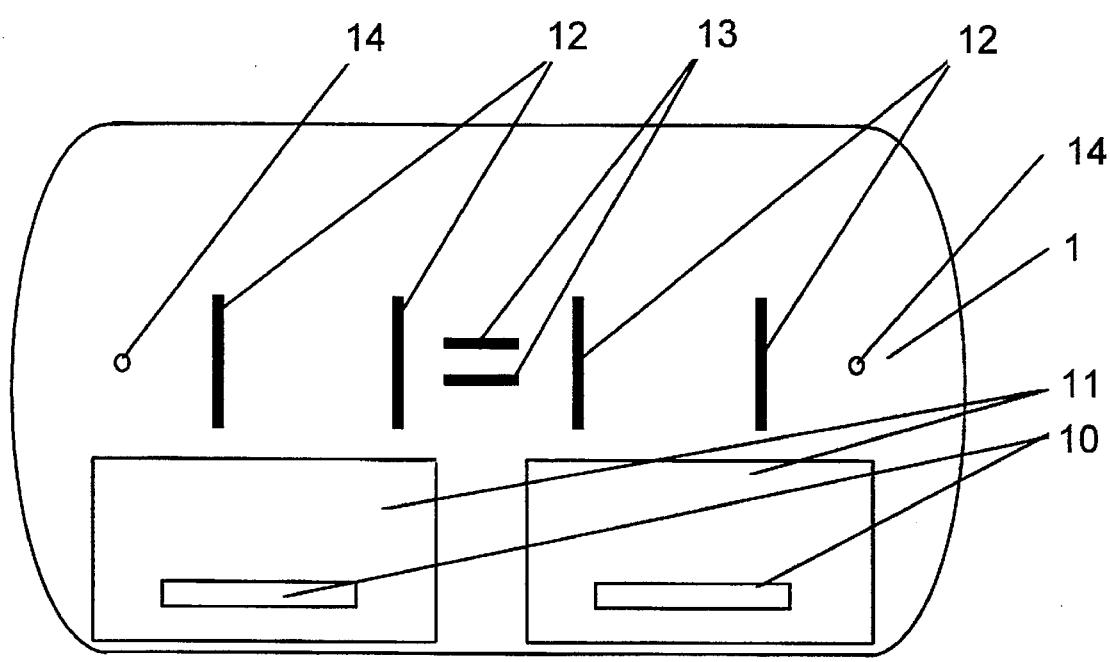
FIG. 2 is an elevation view of the vacuum highway vehicle. There are devices mounted on the outer cylinder 1 for propulsion, levitation, rotation, and sensing. Large conductor surfaces 11 are bonded to the outer cylinder 1 on the lower or upper side in each quadrant. These surfaces hold the electrostatic charges for levitation of the vehicle. Positioned inside the conductor surfaces are elevation sensors 10 which detect the distance between the surface of the outer cylinder 1 and the vacuum highway. Electrical current passing through electrical propulsion conductors 12 in a magnet field accelerates and decelerates the vehicle. Current in the horizontal rotational conductors 13 provide the force to keep the vehicle from rotating or spinning as it travels down the vacuum highway. Position sensors 14 provide the signal for commutation of the current in the vertical propulsion conductors to maintain the propulsion force in the desired direction.
Figure 3:
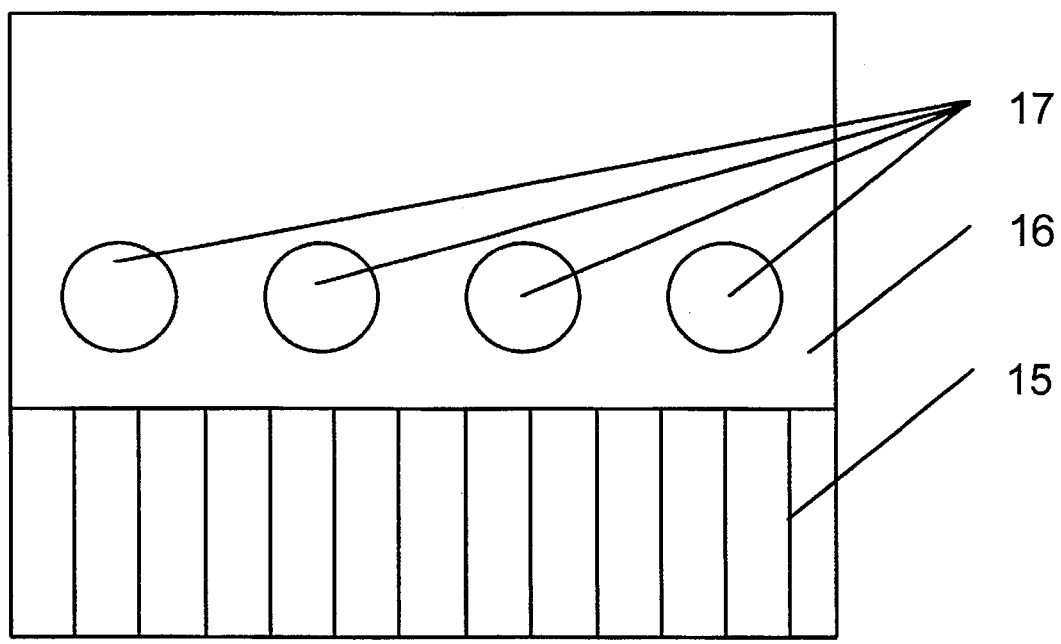
FIG. 3 is a section of the vacuum highway 16. The lower or upper portion of the vacuum highway 16 is plated to form an electrostatic surface 15 for holding a charge for levitation of the vehicle. Magnets 17 are mounted at intervals along the vacuum highway 16 to provide the magnetic field necessary for propulsion and rotational control.
Figure 4:
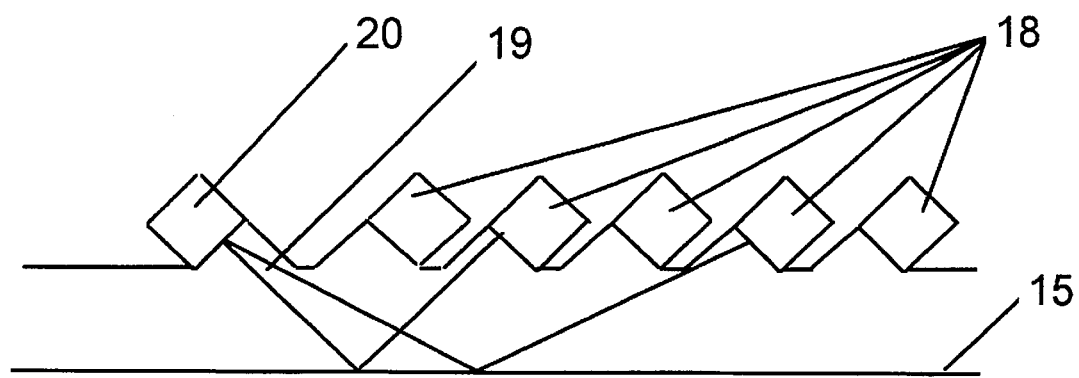
FIG. 4 is a section of an elevation sensor 10. The light source 20 shines a beam 19 on the electrostatic surface 15 of the vacuum highway 16. The beam 19 is reflected to the light sensors 18. The light sensors 18 detecting the beam 19 is a function of the distance between the surface of the vacuum highway 16 and the vehicle surface.
Figure 5:
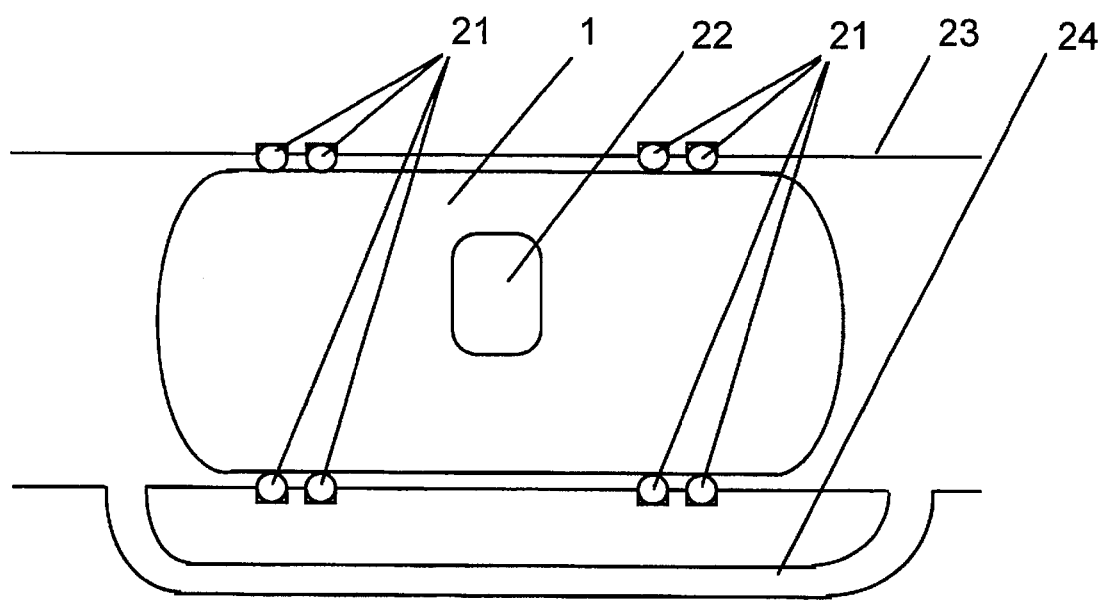
FIG. 5 is a section of the vacuum lock station showing the vacuum highway tubing 23. The O-rings 21 form a redundant seal to allow the volume around the hatch 22 to be pressurized to atmospheric pressure without significant leakage into the vacuum highway. The equalizing line 24 assures the same pressure in the vacuum highway on both ends of the outer cylinder 1 of the vehicle. Different pressures at the ends of the outer cylinder 1 would push the vehicle out of the vacuum lock station.

Referring to FIGS. 1, 2, 3, 4, and 5 the vacuum highway vehicle is comprised of the following:
Outer cylinder 1
Inner cylinder 2
Pump compartment 3
Ballast tanks 4 & 9
Battery compartment 5
Passenger compartment 6
Gas storage compartment 7
Fan compartment 8
Elevation sensors 10
Large conductor surfaces 11
Vertical propulsion conductors 12
Horizontal rotational conductors 13
Position sensors 14
Electrostatic surface 15
Vacuum Highway 16
Magnets 17
Light sensors 18
Beam 19
Light Source 20
O-rings 21
Hatch 22
Vacuum Highway tubing 23
Vacuum equalizing line 24

Since the vehicle will be traveling in a near absolute vacuum a leak would be catastrophic; therefore two containment cylinders are included in the design to protect passengers and cargo. The outer cylinder 1 provides for maintaining atmospheric pressure in the compartments when the vehicle is inside the near absolute vacuum and protects the compartments from leakage from hydraulic pressure when the vehicle is submerged inside the vacuum highway seal. The outer cylinder 1 also contains features which provide levitation, propulsion, and position control. The inner cylinder 2 provides containment protection should the outer cylinder 1 leak. The inner cylinder also provides a surface for attachment of the compartment bulkheads and components within the compartments. Hatches in the cylinders provide an entrance to the vehicle.

The ballast tanks 4 & 9 are filled with water to submerge the vehicle for passage through the vacuum highway seal. The pumps in the pump compartment 3 fill the ballast tanks 4 & 9 for submerging and empty the tanks for floatation and levitation. The pumps are also used for propulsion when the vehicle is submerged or floating.

The batteries in the battery compartment 5 provide power for operation of the pumps, fans, lights, controls, levitation, and propulsion.

Passengers are seated in the passenger compartment 6. The seats are designed for acceleration and deceleration. The passenger compartment also contains sub-compartments for storage of bags and other cargo. The control panel is also located in the passenger compartment. The control panel will provide status of the systems of the vehicle, speed, location, and communications with the highway controller.

Bottles of liquid oxygen are stored in the gas storage compartment 7. Oxygen is released through a vaporizer to maintain the proper oxygen level. Fans in the fan compartment 8 circulate the air in the passenger compartment through filters to remove noxious gases from the air.

Elevation sensors 10 monitor the distance between the outer cylinder 1 and the vacuum highway. There are sensors in each quadrant to maintain adequate separation of the vehicle and the inner surface of the vacuum highway. Separation is controlled by adjustment of the charge on the large conductor surfaces 11. Each quadrant is controlled independently.

The vehicle is propelled by current flowing in the vertical propulsion conductors 12 on the side of the outer cylinder 1 as the propulsion conductor passes through a magnetic field. As the propulsion conductor enters a magnetic field the position sensor 14 turns the circuit on and current flows in the propulsion conductors. When the propulsion conductors leave the magnetic field, the circuit is turned off. This is a type of commutation which prevents other portions of the circuit from creating a force in the opposite direction. To change the direction of the force, the direction of the current in the propulsion conductors is reversed; therefore the propulsion conductors will be used for acceleration and deceleration of the vehicle. The propulsion conductors will be made of many conductors laminated together to obtain the maximum force from each magnetic field.

The horizontal rotational conductors 13 use the same principles as the vertical propulsion conductors; however, their purpose is to maintain rotational control. A sensor based on a pendulum is mounted inside the vehicle. The sensor activates the circuit when the angle of rotation exceeds the setpoint. As the rotational conductor passes through the magnetic field it applies force to adjust the angle of rotation when the circuit is activated.

Vacuum lock stations will be installed along the vacuum highway as required for transfer of passengers and cargo without passage through a vacuum highway seal. At the vacuum lock stations, the vehicle will stop in a bay. O-rings 21 in the bay will form a vacuum seal around the vehicle. The O-rings 21 will be inflated with air or water to form seals. The volume between the O-rings will be pressurized to allow the hatches 22 in the vacuum highway and the vehicle to be opened. Once the stop is complete and the hatches 22 are closed the volume will be evacuated and the vehicle will depart.

A vacuum equalizing line 24 will connect the volumes at both ends of the vehicle to assure there is not a differential pressure, which could push the vehicle out the bay during a stop.

I claim:

1. A vacuum highway and vehicle system, comprising:

a cylindrical structure having redundant cylinders for containment of a habitable environment, a compartment for passengers, ballast tanks, a pump for submersion control to allow the passage from said highway through a vacuum highway seal to a transfer station for transfer of cargo and said passengers, redundant oxygen tanks to supply breathing air, a battery for power, a fan for circulating the air, and a filter for removal of noxious gases;

an electromagnetic propulsion system having magnets mounted on said highway to provide a magnetic field, vertical conductor bars mounted on the exterior of said structure for application of a translational force to said structure by interaction with said magnets on said highway, and an electronic commutator including a position sensor connected to said bars for maintaining said force in a selected direction for acceleration or deceleration;

an electrostatic levitation system having surface conductors on the top or bottom of said structure, and surface conductors on said highway for interaction with said surface conductors on said structure to maintain a charge for levitation of said structure, said surface conductors of said highway being segmented to prevent migration of said charge;

an elevation sensor system having a light source, and an array of photo detectors operatively connected to control current to said conductor bars on said structure for control of levitational elevation; and a rotational control system having horizontal conductor bars mounted on the exterior of said structure for application of rotational force to said structure when passing said magnets, an additional electronic commutator including an additional position sensor connected to said horizontal conductor bars for maintaining said rotational force in a selected direction for rotational stability, and a rotational sensor for selecting said direction of said rotational force.

2. A vacuum highway and vehicle system according to claim 1, further comprising an expandable double O-ring seal disposed at each end of a vacuum highway station for selectively providing a habitable access to said vehicle, and a vacuum equalizing pipe extending beyond each end of said vacuum highway station.

* * * * *